United States Patent
Hebbalalu et al.

[11] Patent Number: 6,130,719
[45] Date of Patent: Oct. 10, 2000

[54] METHOD AND APPARATUS FOR ACCURATELY RECOVERING THE SYNCHRONIZATION SIGNALS CONTAINED IN COMPOSITE VIDEO SIGNALS

[75] Inventors: Kumar Satyanarayana Hebbalalu; Bryan Michael Richter, both of Fremont, Calif.

[73] Assignee: TeleCruz Technology, Inc., San Jose, Calif.

[21] Appl. No.: 09/148,602

[22] Filed: Sep. 4, 1998

[51] Int. Cl.$^7$ .................................................. H04N 5/10
[52] U.S. Cl. ........................... 348/529; 348/530; 348/531
[58] Field of Search .................. 348/525, 529, 348/530, 531, 689, 677, 695, 532; 358/153, 154

[56] References Cited

U.S. PATENT DOCUMENTS

| | | | |
|---|---|---|---|
| 4,707,740 | 11/1987 | Stratton | 348/532 |
| 4,812,907 | 3/1989 | Hathaway | 348/532 |
| 4,853,782 | 8/1989 | Asano et al. | 348/525 |
| 4,859,872 | 8/1989 | Hyakutake | 307/269 |
| 5,027,017 | 6/1991 | Fling | 348/525 |
| 5,053,869 | 10/1991 | Pletz-Kirsch | 358/153 |
| 5,191,422 | 3/1993 | Cho et al. | 348/695 |
| 5,280,356 | 1/1994 | Hiramatsu et al. | 358/171 |
| 5,345,117 | 9/1994 | Tomotsume | 348/525 |
| 5,436,667 | 7/1995 | Logoni et al. | 348/525 |
| 5,805,150 | 9/1998 | Nishino et al. | 345/213 |
| 5,929,900 | 7/1999 | Yamanaka et al. | 348/65 |

*Primary Examiner*—John K. Peng
*Assistant Examiner*—Trang U. Tran
*Attorney, Agent, or Firm*—Law Firm of Naren Thappeta

[57] ABSTRACT

A method of recovering synchronization signals contained in a composite video signal. The synchronization signals are generally represented by voltage levels less than the blanking level of the video signal, and display data is represented by blanking level. A digital circuit controls a biasing circuit to generate a biasing voltage. A video signal is biased using the biasing voltage and the resulting biased video signal is provided as an input to an operational amplifier. A second input of the operational amplifier is driven by a reference voltage. The digital circuit monitors the output of the operational amplifier and controls the biasing voltage to cause the operational amplifier to clip the display data from the biased video signal and generate a signal representing synchronization signals.

14 Claims, 8 Drawing Sheets

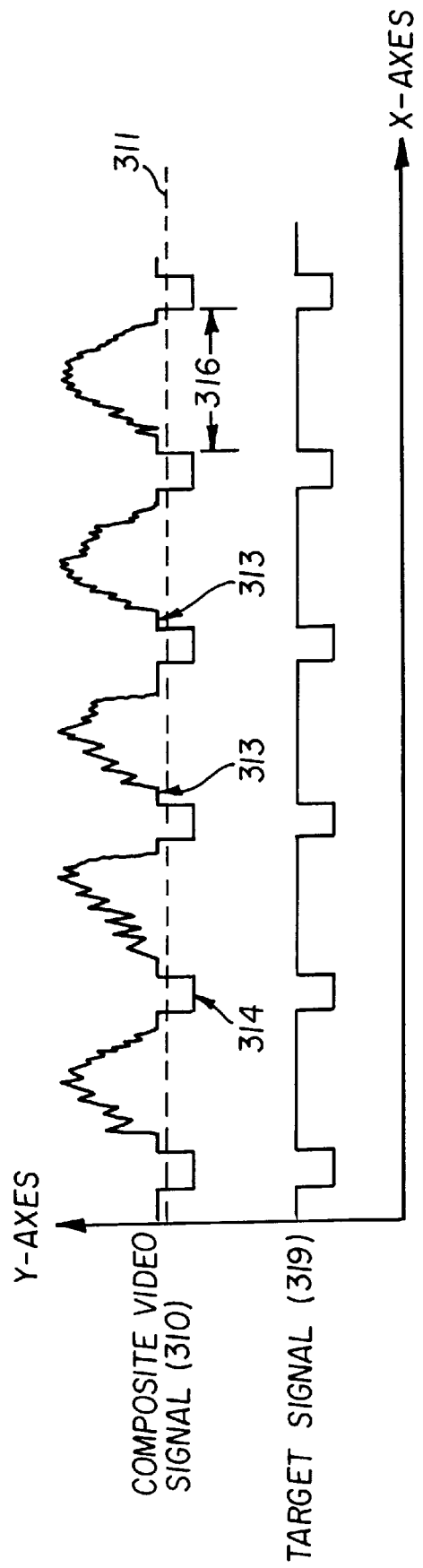

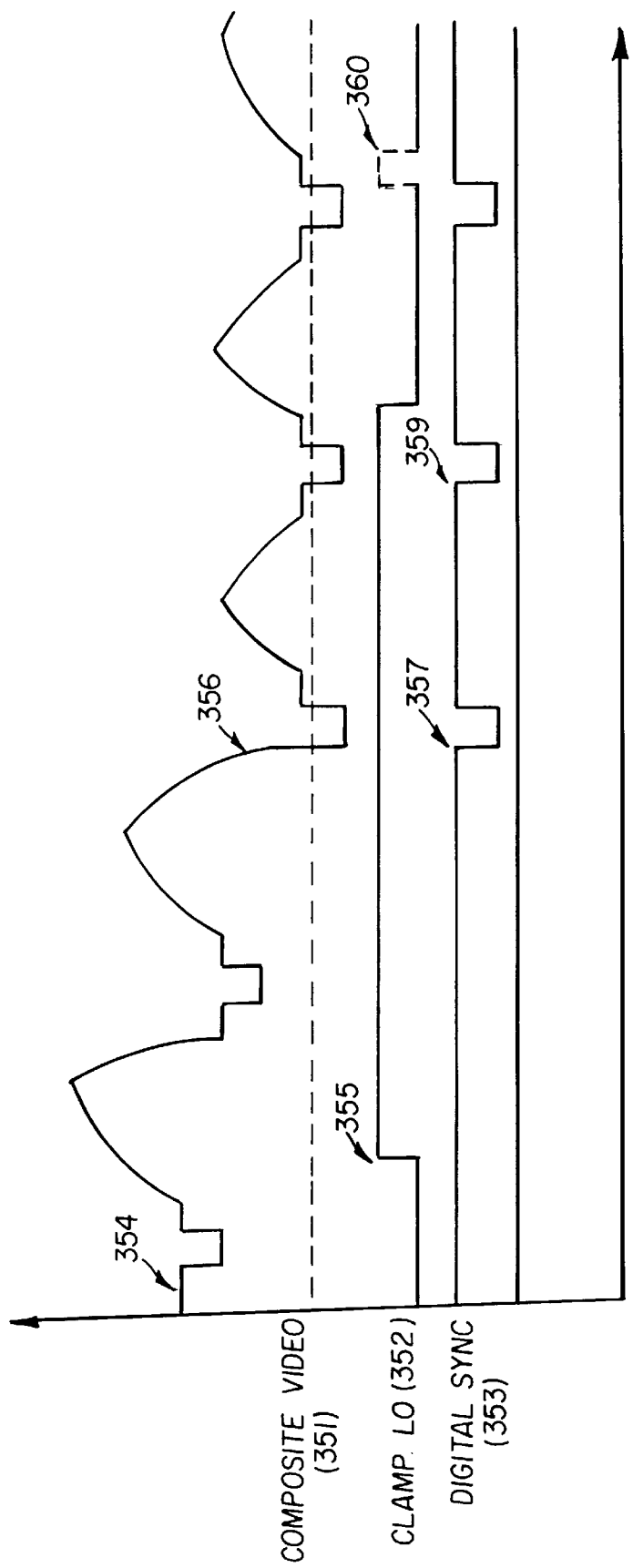

METHOD AND APPARATUS FOR ACCURATELY RECOVERING THE SYNCHRONIZATION SIGNALS CONTAINED IN COMPOSITE VIDEO SIGNALS

BACKGROUND OF THE INVENTION

1. Field of the Invention

The present invention relates to systems such as television systems used for displaying images encoded (or embedded) in a composite video signal, and more specifically to a method and apparatus for recovering the synchronization signals contained in composite video signals.

2. Related Art

Video signals typically contain display and non-display data. Display data generally represents images. Closed captioning data, teletext and electronic programing guide data are examples of non-display data. Video signals are usually generated at distant locations by broadcast companies or locally from devices such video cassette players (VCPs).

A television system (TV) typically receives video signals of a predetermined format and displays the encoded images. A TV may also recover and further process (including displaying) any non-display data. Other systems such as computer systems may also be designed to perform similar operations on a received video signal, as will be apparent to one skilled in the relevant arts.

Video signals are often generated and transmitted in composite format. That is, the same communication path and medium may be used for transmitting the data (display and/or non-display) and synchronization signals as is well known in the relevant arts. The data generally represents the color and luminosity of different portions of an encoded image and/or the other types of data as described above. The synchronization signals typically provide a time reference for recovering and further processing the embedded data.

As an illustration, a video signal may contain horizontal synchronization (HSYNC) signals for separating the display data portions corresponding to successive horizontal lines of an encoded image. Similarly, vertical synchronization signals (VSYNC) separate display data portions corresponding to successive image frames.

There is a need to recover the synchronization signals accurately from such composite video signals. For example, a sampling clock signal may be generated for sampling the display data signals. It is generally required that the sampling clock signal be synchronized accurately with the synchronization signals to enable the resulting sampled data values to represent the points of the encoded images correctly. At least for such a reason, there may be a need to accurately recover the synchronization signals.

Therefore, what is needed is a method and apparatus for accurately recovering the synchronization signals contained in composite video signals.

SUMMARY OF THE INVENTION

The present invention is directed to the recovery of synchronization signals contained in a composite video signal. The composite video signal includes display data also. At least in video signals used in conjunction with television systems, the display data is encoded using voltage levels above a voltage level representing the blanking level as is well known in the relevant arts. The synchronization signals are encoded below the blanking level.

The present invention clips a composite video signal just below the blanking level to generate the synchronization signals. A digital circuit is used for such clipping, offering considerable flexibility and reliability in the recovery of synchronization signals. In an embodiment, the digital circuit is employed in combination with a comparator circuit (an example implementation of an operational amplifier) and a biasing circuit as described below.

One input of the operational amplifier may be driven by a reference voltage. The reference voltage is preferably a constant D.C. voltage (representing the D.C. value of the blanking level at which the composite video signal is to be clipped.) The second input of the operational amplifier is driven by a biased video signal. A biasing circuit is employed to bias the video signal.

The biasing circuit may include a clamp-high transistor driven by a clamp-high signal, and a clamp-low transistor driven by a clamp-low signal. Assertion of the clamp-high signal causes the biasing voltage level to be raised and assertion of the clamp-low signal causing the biasing voltage level to be lowered.

A digital circuit cools the biasing voltage in accordance with the present invention. In general, the digital circuit monitors the output of the comparator and controls the biasing voltage level to cause the operational amplifier to clip the biased composite video signal above the reference level. As a result of the clipping, a signal representing the synchronization signals is generated at the output of the operational amplifier.

According to one technique, the digital circuit may first bias the video signal to a high voltage level (by asserting the clamp-high signal) such that only one signal level (e.g., high logic value) is present on the output of the comparator. The digital circuit may then gradually pull the biasing voltage level down (by asserting the clamp-low signal) until only the synchronization pulses are present on the output.

According to another technique, the biasing voltage level may be first kept low such that only one signal level (e.g., low logic value) is generated on the output of the operational amplifier. The biasing voltage may then be raised gradually until the reference voltage is below the blanking level. As a result only synchronization signals may be generated at the output of the operational amplifier.

Therefore, the present invention recovers the synchronization signals contained in a composite video signal. This may be accomplished by clipping the video signal above the voltage level used to represent the blanking level.

The present invention provides considerable flexibility by controlling the biasing voltage using a digital circuit. Considerable reliability in the recovery may also be provided due to the digital circuit employed.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 3A is a graph illustrating the ideal clipping of a composite video signal to recover a composite synchronization signal;

FIG. 3C is a graph illustrating another example technique of recovering the composite synchronization signals in accordance with the present invention;

DETAILED DESCRIPTION OF THE PREFERRED EMBODIMENTS

Figure 1:
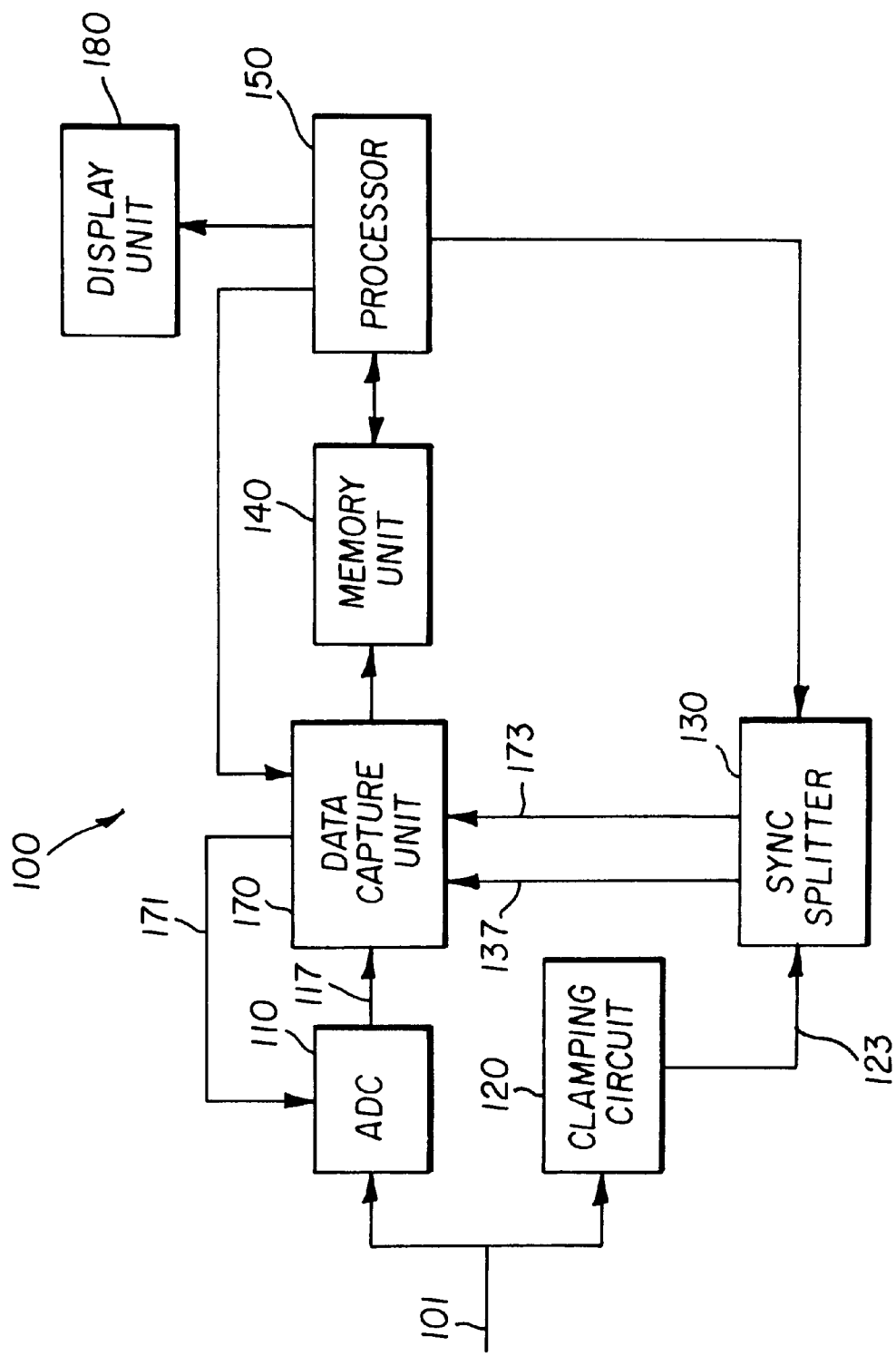
FIG. 1 is a block diagram of a television system illustrating an example environment in which the present invention can be implemented.

1. Overview and Discussion of the Present Invention

The present invention is described in the context of television system 100, which recovers the synchronization signals contained in a received video signal in accordance with the present invention. Television system (TV) 100 may include analog-to-digital converter (ADC) 110, clamping circuit 120, sync splitter 130, memory unit 140, processor 150, data capture unit 170, and display unit 180.

ADC 110 receives a sampling clock signal from data capture unit 170, on line 171, and samples a composite video signal received on line 101. As a result, ADC 110 generates sampled data values on line 117. In an embodiment, ADC 110 may sample a video signal at a frequency of 16.67 MHZ. Data capture unit 170 may receive the sampled data values and process the received values. In an embodiment, data capture unit 170 may operate as a filter. The values generated by data capture unit 170 may be stored in memory unit 140.

Sync splitter 130 receive the digital composite synchronization signal (including both horizontal (HSYNC) and vertical (VSYNC) synchronization signals) on line 123, and generate HSYNC signals on line 137 and VSYNC signals on line 173 in a known way. Data capture unit 170 may receive the synchronization signals and generate a sampling clock synchronized with the received synchronization signals.

Clamping circuit 120 may be provided in a single unit along with ADC 110 in one embodiment. Clamping circuit 120 receives video signals on line 101, and generates a digital composite synchronization signal including both horizontal and vertical synchronization signals on line 123 in accordance with the present invention. That is, clamping circuit 120 may recover the synchronization signals contained in a video signal received on line 101.

Processor 150 may retrieve the sampled data values from memory unit 140 and generate display signals to display unit 180 also in a known way. In addition, processor 150 may control and coordinate the operation of the remaining components. Examples of actions by processor 150 may include initializing clamping circuit 120 and sync-splitter 130, and enabling of the data capture unit 170. Display unit 180 may be conventional, and usually depends on the specific display technology chosen in TV 100.

Clamping circuit 120 recovers the synchronization signals in accordance with the present invention. Specifically, clamping circuit 120 may use a comparator such as an operational amplifier, and bias the video signal until only the synchronization signals are generated as an output of the operational amplifier. In addition, a digital circuit is to bias the video signal and examine the output of the operational amplifier.

Due to the digital control, the present invention offers considerable flexibility in recovering the synchronization signals from video signals of different formats (e.g., NTSC and PAL). In addition, the present invention provides for reliable recovery of the synchronization signals because of the digital control.

The present invention is described below in further detail with respect to several example embodiments.

2. Clamping Circuit

Figure 2:
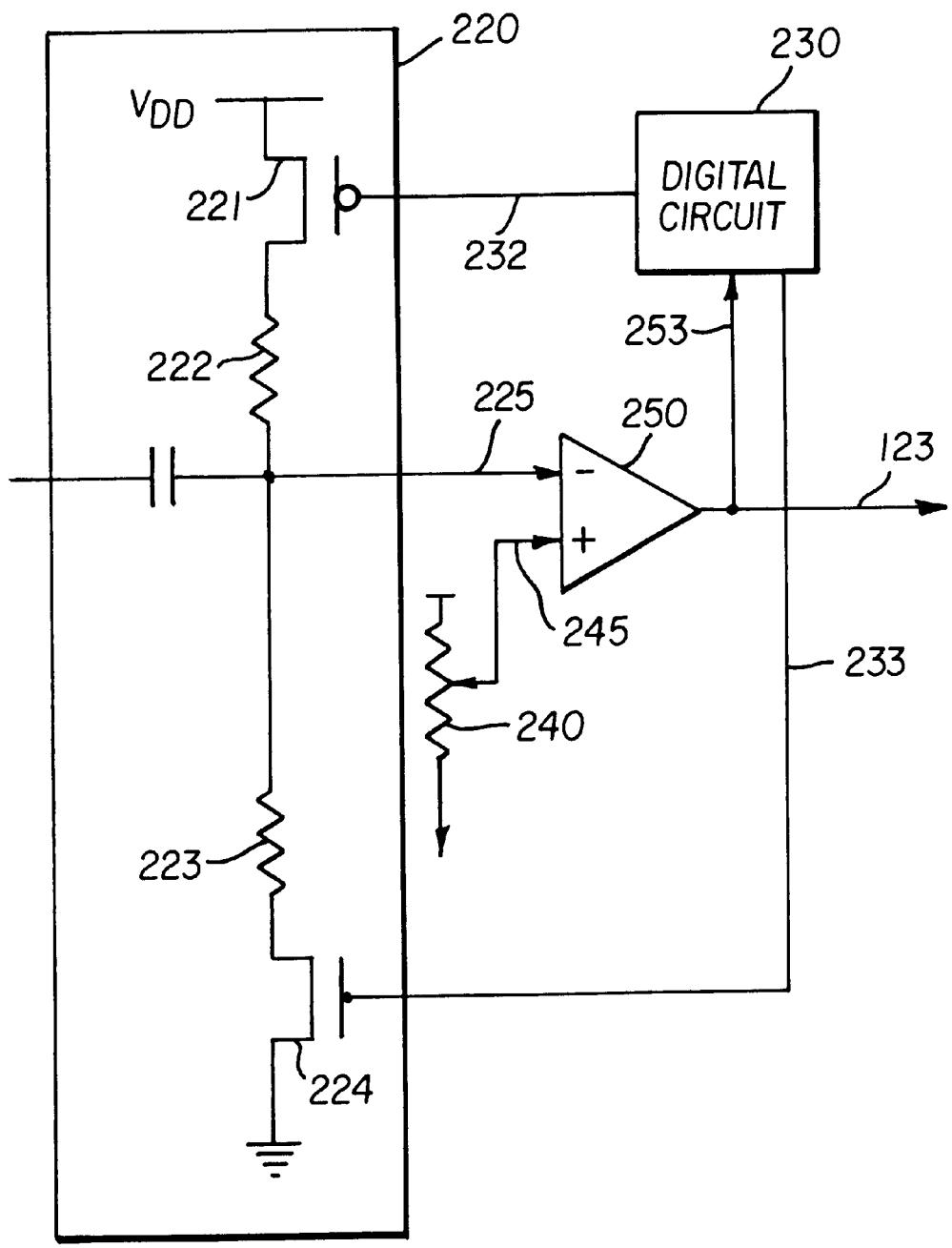
FIG. 2 is a block diagram of a clamping circuit implemented in accordance with the present invention.

An embodiment of clamping circuit 120 is described with reference to FIG. 2. FIG. 2 is a block diagram of clamping circuit 120 illustrating the details of operation and implementation of the embodiment. Clamping circuit 120 may include biasing circuit 220, digital circuit 230, and operational amplifier 250.

Operational amplifier 250 includes two inputs 225 and 245, and an output 253. Output 253 is at one logic level (e.g., 0) if the voltage level on input 225 is greater than the voltage level on input 245, and at a second logic level (1) otherwise. Input 245 may be termed as reference signal and may be provided as a fixed voltage level representing the D.C. value at which the biased composite video signal 225 is to be sliced. Input 225 may be termed biased video signal for reasons noted below.

Biasing circuit 220 and digital circuit 230 operate to drive input 225 to cause operational amplifier 250 to generate an output signal 253 representing the synchronization signals contained in the input composite video signal. In other words, the synchronization signals may be recovered in accordance with the present invention. Biasing circuit 220 operates to bias the composite video signal received on line 101 to a higher or lower level as determined by digital circuit 230. A D.C. voltage level can be used for such biasing.

In an embodiment, biasing circuit 220 may include clamp-high transistor 221, resistors 222 and 223, clamp-low transistor 224. An input of clamp-high transistor 221 may be driven by Vdd (high voltage) and an input of clamp-low transistor 224 may be grounded. When clamp-high line 232 is asserted by the digital circuit, the voltage on line 225 raises to a higher level. When clamp-low line 233 is asserted, the biasing voltage is driven lower. When both clamp high and clamp-low lines are asserted, the biasing voltage may remain constant.

Figure 3B:
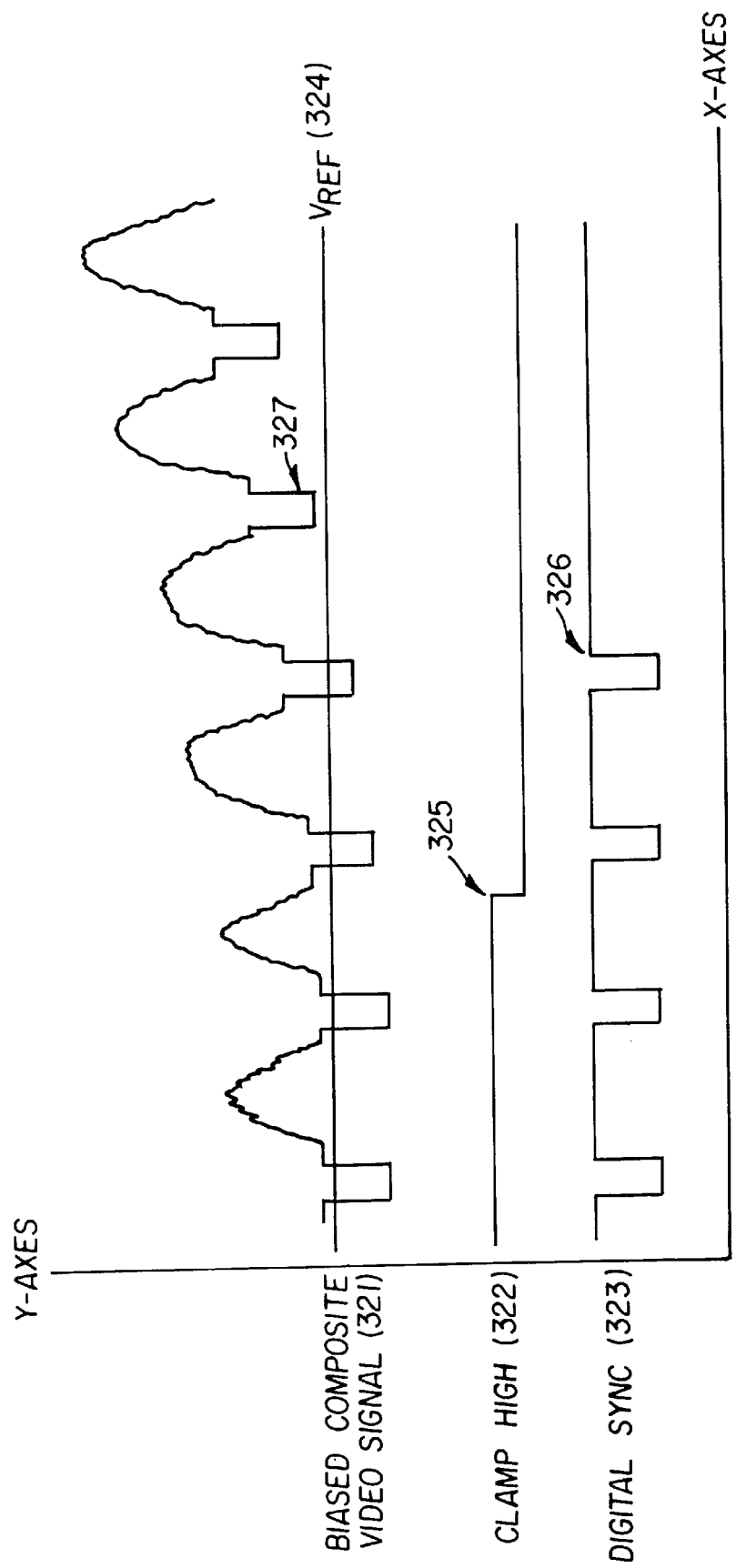
FIG. 3B is a graph illustrating an example technique of recovering the composite synchronization signals in accordance with the present invention.

Digital circuit 230 may be designed to examine output 253 and determine the necessary biasing voltage to clamp the input video signal to cause operational amplifier 250 to generate the synchronization signals. The operation of digital circuit 230 is described with combined reference to FIGS. 2 and 3A–3C. In FIGS. 3A–3C, X-axis represents time and voltages are represented along Y-axis.

FIG. 3A is a graph illustrating composite video signal 310 and ideal slicing level 311 which would generate composite (including both HSYNC and VSYNC) synchronization signal 312. Ideal slicing level 311 represents a voltage level just below the voltage level used for blanking level 313 (used with television technology). The desired composite synchronization signal is represented as target signal 319, which would be generated when the input video signal is sliced as shown. The manner in which ideal slicing can be achieved is described below.

FIGS. 3B and 3C illustrate two example techniques for achieving the slicing using the embodiment(s) described with reference to FIGS. 1 and 2. In FIG. 3B, the biased composite video signal (provided on line 232 as input to operational amplifier 250) is shown with reference numeral 321, the clamp high signal (provided on line 232 in FIG. 2) is shown with reference numeral 322, and the output of operational amplifier 250 is shown as digital sync signal 323.

The Vref signal (the second input to operational amplifier 250) is shown with reference numeral 324. When instantaneous voltage level of Vref signal is less than the voltage level of video signal 321, digital sync 323 is at a low voltage level, and at a high voltage level otherwise. This property may be exploited to recover the synchronization signals as described in detail below.

As noted above, when clamp-high signal 322 is asserted (by asserting to a low logic level), the composite video signal is biased to higher voltage levels. Clamp-high signal 322 is shown deasserted until time point 325 and accordingly the voltage level of the video signal is shown without any modification (due to biasing).

The clamp-high signal is shown asserted from point 325 onwards. Accordingly, the voltage level of the input video signal is raised higher as can be readily observed by examination of the HSYNC pulses (327) from point 325 onwards. So long as the synchronization pulses tip has a voltage level less than Vref 324, digital sync 323 is shown including the synchronization signals.

Accordingly, digital circuit 230 may first bias the input video signal to a sufficiently low level such that the synchronization signals are recovered on the digital sync signal. To ensure that noise does not affect the detection of the synchronization signals, the video signal may be biased such that the Vref voltage level is slightly lower than the voltage level used to represent the blanking level signal portion.

In an alternative embodiment illustrated with reference to FIG. 3C, composite video signal is shown biased to a high voltage level. Digital circuit 230 cause such high voltage levels by first asserting the clamp-high input. Digital circuit 230 may then slowly pull the voltage level down by asserting (by raising the voltage level to a high logic level) the clamp-low signal.

Thus, in FIG. 3C, video signal 351 is shown biased to a high voltage level at point 354, and the clamp-low signal 351 (provided on line 233 of FIG. 2) is shown asserted starting at point 355. The voltage of the video signal is pulled down as a result, as can be readily noticed by examining the tip of the HSYNC pulses.

Based on the examination of HSYNC pulse 359, digital circuit 230 may determine that the biasing voltage is appropriate to recover the synchronization signals, and accordingly may de-assert clamp-low signal 351. To maintain the same biasing level, digital circuit 230 may assert both clamp-low and clamp-high signals during every blanking level portion as shown at 360.

It may be noted that the vertical synchronization signals may also be recovered in on digital sync signals 323 and 353. Accordingly, a composite signal including both vertical and horizontal synchronization signals may be recovered by clamping circuit 120. Sync splitter 130 may separate the two synchronization signals in a known way.

In the description above, digital circuit 230 is described as driving the clamp-high and clamp-low signals. An embodiment of digital circuit 230 is described below in detail.

3. Digital Circuit

Figure 6:
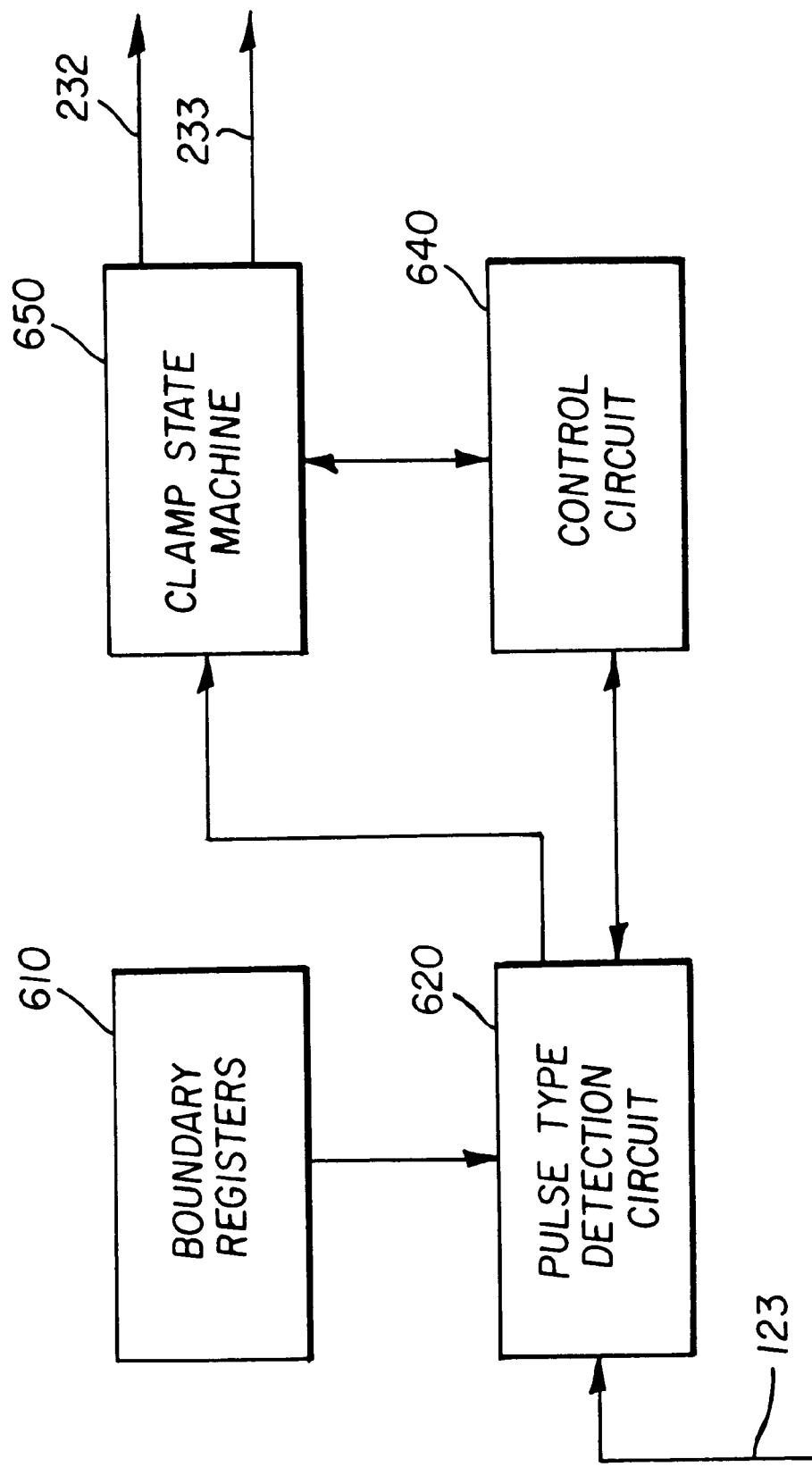
FIG. 6 is a block diagram of an embodiment of digital circuit controlling the biasing voltage.

FIG. 6 is a block diagram illustrating the details of implementation of digital circuit 230 in one embodiment. Digital circuit 230 includes boundary registers 610, pulse-type detection circuit 620, clamp state machine 650, and control circuit 630. Control circuit 630 provides the various timing and control signals to coordinate and control the operation of other components present in digital circuit 230.

Boundary registers 610 may include several registers for storing different parameters which control the operation of digital circuit 230, for example, the maximum and minimum number of clock ticks representing the duration of a valid HSYNC pulse. The parameters may control the operation of both pulse-type detection circuit 620 and clamp state machine 650. The registers may be programmable and set to different values by processor 150. Due to the programmability, the present invention provides a designer with considerable flexibility in recovering the synchronization signals.

Pulse type detection circuit 620 receives the output of operational amplifier 250 and determines whether a valid pulse is present. The pulse can be either HSYNC and VSYNC. The parameters in boundary registers 610 may be used to determine whether a received signal represents a HSYNC or VSYNC signal. As an illustration, the number of clocks between 2 falling edges of the composite signal may be counted and compared to upper and lower bounds. If the number of clocks falls within the bounds, a valid HSYNC pulse may be determined to exist. The duration of the HSYNC width may also be specified in the registers.

Similarly a valid VSYNC may also be detected. VSYNC start is detected by counting the number of clocks the composite sync signal is determined to be at a low logic level. This is compared to a programmable minimum bound, and if the count exceeds this bound, VSYNC is determined to be present. The reception of VSYNC and HSYNC pulses may be communicated to clamp state machine 650. The presence of valid or invalid pulses may also be indicated to clamp state machine 650. A pulse may be invalid if the pulse duration represents neither a HSYNC pulse or a VSYNC pulse.

Clamp state machine 650 examines the signals generated by pulse type detection circuit 620 and drives the clamp-high 232 and clamp-low 233 to recover the synchronization signals. Clamp state machine 650 can be implemented according to various techniques. For conciseness, the implementation for only FIG. 3C is described below. However, other implementation for other techniques will be apparent to one skilled in the relevant arts, and such other implementations are contemplated to be within the scope and spirit of the present invention.

4. Clamp State Machine

Figure 4:
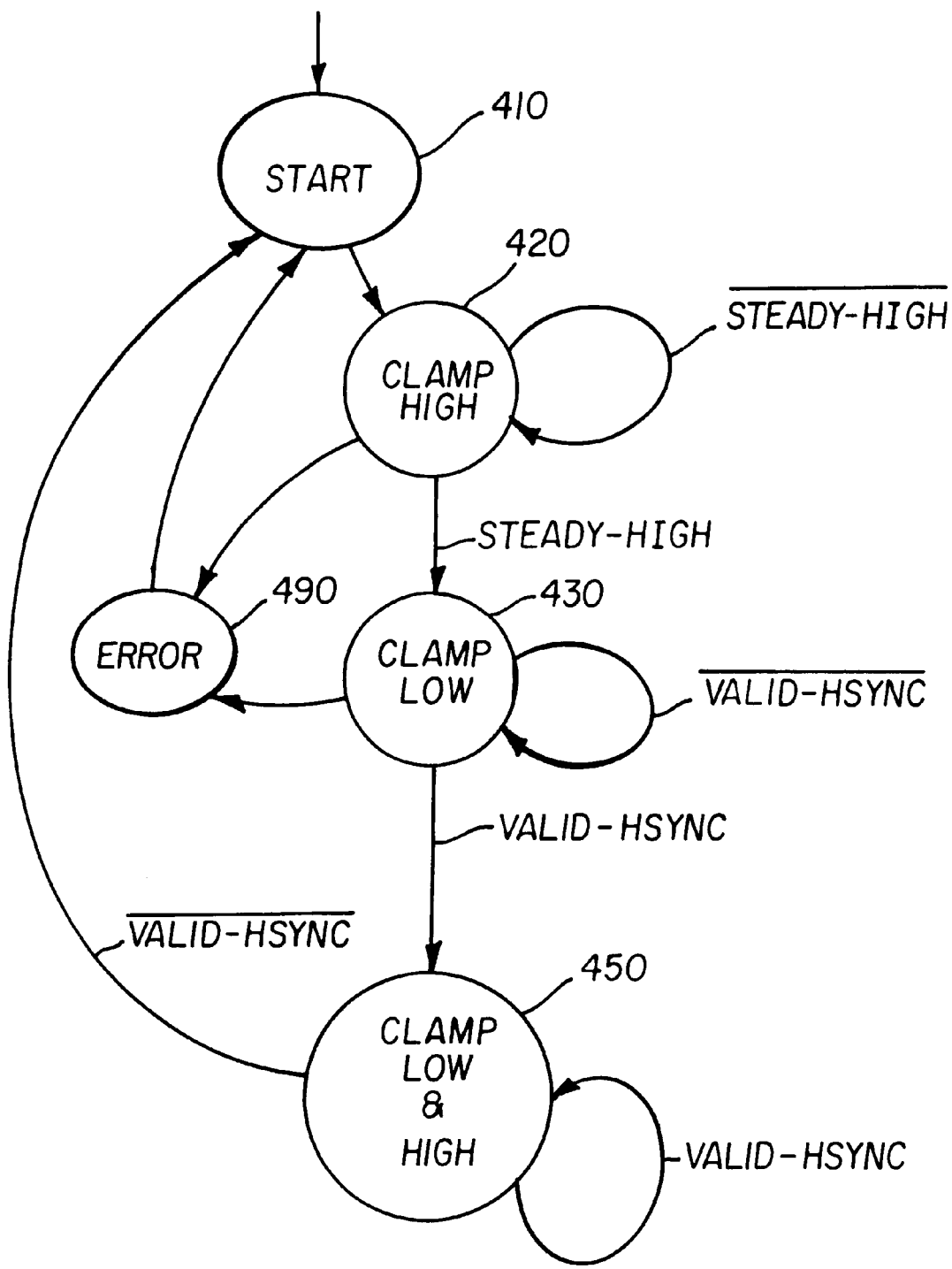
FIG. 4 is a state diagram illustrating a simplified technique of recovering the composite synchronization signals.

FIG. 4 is a state diagram illustrating the operation of an embodiment of clamp state machine 650. In step 420, clamp state machine 650 continues to assert clamp high signal 232 until a steady high signal is received on line 253 (as indicated by pulse type detection circuit 620). The length of duration may be measured in terms of clock ticks from control circuit 630 and may be set boundary registers 610. Once a steady-high signal is received for that length, control passes to state 430. In FIG. 3C, the passing of control may correspond to point 355.

In step 430, the biasing voltage level may be decreased by asserting clamp low signal 233. The signal may be asserted until the programed number of valid HSYNC pulses are detected. A HSYNC pulse may be determined to be present if the output of operational amplifier 250 stays low only a length of duration specified between the upper and lower bounds in boundary registers 610. A valid HSYNC may be deemed to be received only if the received signal is deemed to include successive HSYNCS without invalid pulses in between and with a valid HPERIOD duration between the detected HSYNCS.

Once a sync lock is determined to be present, clamp state machine 650 may control the clamp-high and clamp-low signals to ensure that the video signal is biased to the right level (as shown in FIG. 3A). In state 450, the clamp-high and clamp-low signals may be asserted with every blanking level signal portion to maintain the same biasing level to recover the synchronization signals. If a sync lock is determined to be lost, control may pass to state 410 to start the recovery process from the beginning. Sync lock is determined to have been lost if either more than the programed number of invalid pulses occur within the given period of time or no HSYNC pulse is received within a programed number of Hperiods.

Thus, using the embodiments of above, synchronization signals contained in a composite video signal can be recovered in accordance with the present invention. A method according to the present invention is described below.

5. Method According to Present Invention

Figure 5:
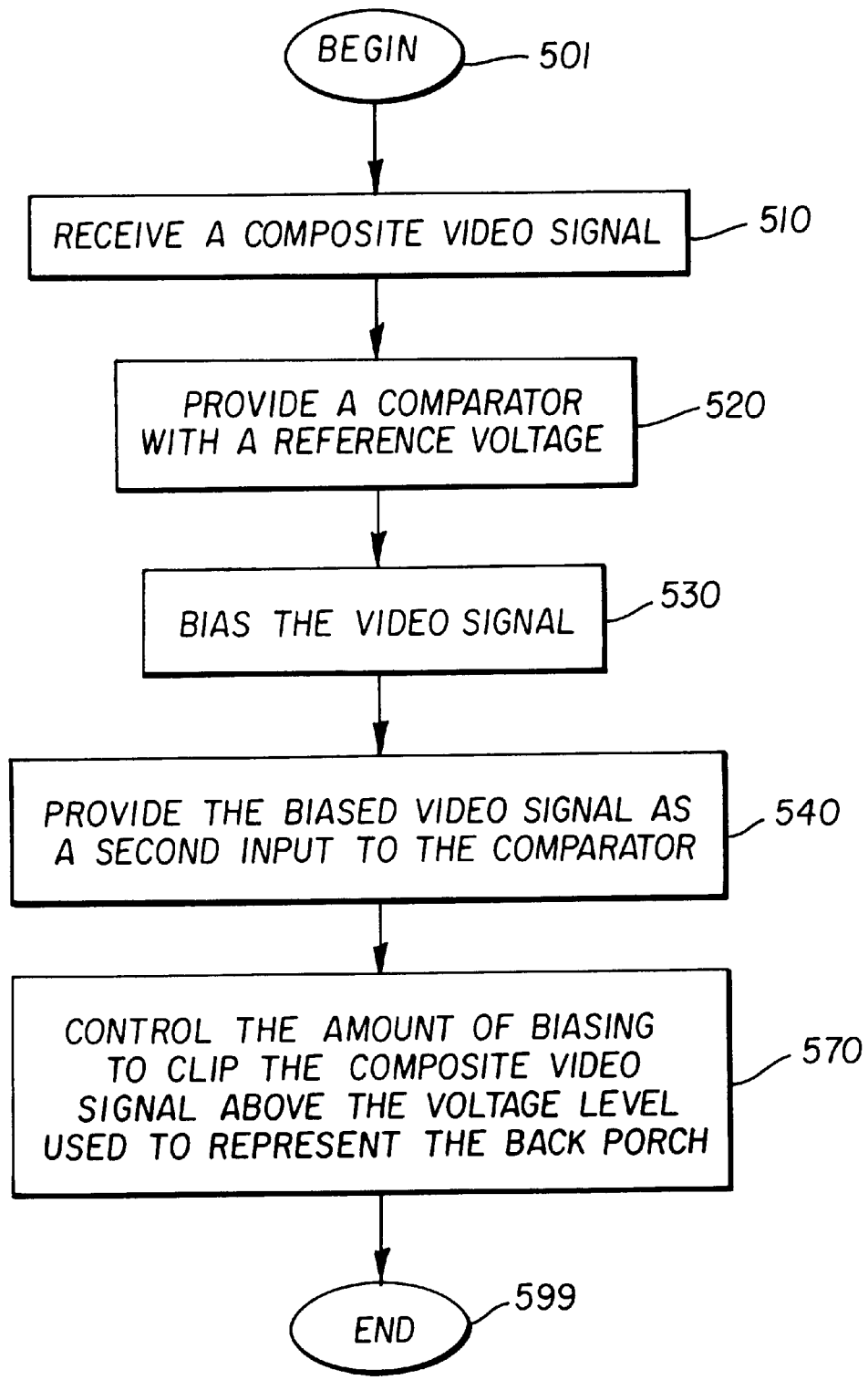
FIG. 5 is a flow-chart illustrating a method according to the present invention.

FIG. 5 is a flow-chart illustrating a method according to the present invention. In step 510, a composite video signal is received. In step 520, a comparator is provided with the appropriate reference voltage as a first input to the comparator. The reference voltage preferably is a constant D.C. voltage.

In step 530, the received video signal is biased. The biased voltage signal is provided as a second input to the comparator in step 540. In step 570, the amount of biasing can be controlled to clip the video signal portion above the blanking level voltage level. A digital circuit may be employed to accurately control the clipping levels. As a result of the clipping, the synchronization signals may be recovered in accordance with the present invention.

Thus, the present invention can be used to recover synchronization signals present in a composite video signal. Even though the present invention is described with reference to television systems above, it should be understood that the present invention can be implemented in other systems (e.g., computer system used to view television signals) as well.

In addition, even though the video signals are described as being of a format suitable for use in television systems, the present invention can be applied with other types of display signals as well.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A circuit for recovering the synchronization signals contained in a composite video signal, wherein said composite video signal further contains display data, said display data being encoded using voltage levels above a slicing level and said synchronization signals being encoded using voltage levels below said slicing level, said circuit comprising:

a comparator having two inputs and an output, wherein said comparator generates a first logic value on said output when the voltage level on a first one of said two inputs is greater than the voltage level on a second one of said two inputs, said comparator generating a second logic value otherwise, said second input of said comparator being driven by a reference voltage;

a biasing circuit for receiving said composite video signal, said biasing circuit being designed to bias said composite video by a biasing voltage level to generate a biased video signal, said biased video signal being provided on said first input of said comparator; and a digital circuit for controlling said biasing voltage level, wherein said digital circuit is coupled to said output of said comparator, said digital circuit examining said output to determine whether said synchronization signals are present on said output, said digital circuit varying said biasing voltage level until said comparator generates a signal representing said synchronization signals on said output, said digital circuit further comprising:

a plurality of boundary registers for storing numbers representing the characteristics of said synchronization signals;

a pulse type detection circuit for receiving output of said comparator, said pulse type detection circuit being designed to examine said numbers stored in said plurality of boundary registers, said pulse type detection circuit generating signals representing the presence and absence of said synchronization signals in said output of said comparator; and a state machine coupled to receive said signals generated by said pulse type detection circuit, said state machine controlling said two inputs of said comparator.

2. The circuit of claim 1, wherein said comparator comprises an operational amplifier.

3. The circuit of claim 2, wherein said biasing circuit comprises a clamp-high transistor driven by a clamp-high signal, said biasing circuit also comprising a clamp-low transistor driven by a clamp-low signal, assertion of said clamp-high signal causing said biasing voltage level to be raised and assertion of said clamp-low signal causing said biasing voltage level to be lowered, wherein said digital circuit drives said clamp-high signal and said clamp-low signal to cause said operational amplifier to generate said synchronization signals on said output.

4. The circuit of claim 3, wherein said slicing level corresponds to a voltage level slightly below the voltage level used to represent a blanking level of said video signal.

5. The circuit of claim 3, wherein said digital circuit is designed to raise said biasing voltage level such that said operational amplifier generates a constant voltage level (high) on said output, and then lower the biasing voltage level until pulses representing said synchronization signals are generated on said output.

6. The circuit of claim 3, wherein said digital circuit is designed to first lower said biasing voltage level such that said operational amplifier generates a constant voltage level on said input and then raise said biasing voltage level until pulses representing said synchronization signals are generated on said output and then raising band biasing voltage level until said voltage level is at said reference level.

7. A system for displaying the images encoded in a composite video signal, wherein said composite video signal further containing synchronization signals, said display data being encoded using voltage levels above a slicing level and said synchronization signals being encoded using voltage levels below said slicing level, said system comprising:

an analog-to-digital converter (ADC) for receiving said video signal and sampling said display data under the control of a sampling clock to generate a plurality of sampled data elements representing said image encoded in said composite video signal;

a memory unit for storing a plurality of values representing said images, wherein said plurality of values are generated from said plurality of sampled data elements;

a clamping circuit for receiving said composite video signal and generating said synchronization signals, said clamping circuit comprising:

a comparator having two inputs and an output, wherein said comparator generates a first logic value on said output when the voltage level on a first one of said two inputs is greater than the voltage level on a second one of said two inputs, said comparator generating a second logic value otherwise, said second input of said comparator being driven by a reference voltage;

a biasing circuit for receiving said composite video signal, said biasing circuit being designed to bias said composite video by a biasing voltage level to generate a biased video signal, said biased video signal being provided on said first input of said comparator; and a digital circuit for controlling said biasing voltage level, wherein said digital circuit is coupled to said output of said comparator, said digital circuit examining said output to determine whether said synchronization signals are present on said output, said digital circuit varying said biasing voltage level, until said comparator generates a signal representing said synchronization signals on said output, said digital circuit further comprising:

a plurality of boundary registers for storing numbers representing the characteristics of said synchronization signals;

a pulse type detection circuit for receiving output of said comparator, said pulse type detection circuit being designed to examine said numbers stored in said plurality of boundary registers said pulse type detection circuit generating signals representing the presence and absence of said synchronization signals in said output of said comparator; and a state machine coupled to receive said signals generated by said pulse type detection circuit, said state machine controlling said two inputs of said comparator;

wherein said synchronization signals are used to generate said sampling clock to said ADC.

8. The system of claim 7, wherein said comparator comprises an operational amplifier.

9. The system of claim 8, wherein said biasing circuit comprises a clamp-high transistor driven by a clamp-high signal, said biasing circuit also comprising a clamp-low transistor driven by a clamp-low signal, assertion of said clamp-high signal causing said biasing voltage level to be raised and assertion of said clamp-low signal causing said biasing voltage level to be lowered, wherein said digital circuit drives said clamp-high signal and said clamp-low signal to cause said operational amplifier to generate said synchronization signals on said output.

10. The system of claim 9, wherein said slicing level corresponds to a voltage level slightly below the voltage level used to represent a blanking level of said video signal.

11. The system of claim 9, wherein said digital circuit is designed to raise said biasing voltage level such that said operational amplifier generates a constant voltage level (high) on said output, and then lower the biasing voltage level until pulses representing said synchronization signals are generated on said output.

12. The system of claim 9, wherein said digital circuit is designed to first lower said biasing voltage level such that said operational amplifier generates a constant voltage level on said input and then raise said biasing voltage level until pulses representing said synchronization signals are generated on said output and then raising band biasing voltage level until said voltage level is at said reference level.

13. The system of claim 8, wherein said system comprises a television system.

14. The system of claim 8, wherein said system comprises a computer system.

* * * * *